US008712386B2

(12) United States Patent
Lee (10) Patent No.: US 8,712,386 B2
(45) Date of Patent: Apr. 29, 2014

(54) CONTROLLING RING-BACK TONE OUTPUT PRIOR TO A COMMUNICATION CONNECTION IN MOBILE TERMINAL (75) Inventor: Seung-Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 787 days.

(21) Appl. No.: 11/681,952

(22) Filed: Mar. 5, 2007

(65) Prior Publication Data
US 2008/0102883 A1 May 1, 2008

(30) Foreign Application Priority Data

Oct. 27, 2006 (KR) .......................... 10-2006-105344

(51) Int. Cl.
H04M 3/42 (2006.01)
H04M 3/00 (2006.01)

(52) U.S. Cl.
USPC ........................................ 455/414.1; 379/418

(58) Field of Classification Search
USPC ........................................ 379/418; 455/414.1
See application file for complete search history.

(56) References Cited

U.S. PATENT DOCUMENTS

| 4,410,765 | A | * | 10/1983 | Hestad et al. | ............ | 379/114.02 |
| 5,347,565 | A | | 9/1994 | Uekama | | |
| 6,014,434 | A | | 1/2000 | Kim | | |
| 7,447,496 | B2 | * | 11/2008 | Hahm et al. | ............... | 455/414.1 |
| 7,640,041 | B2 | * | 12/2009 | Ragan | ........................... | 455/572 |
| 2002/0045438 | A1 | * | 4/2002 | Tagawa et al. | ................ | 455/412 |
| 2004/0102163 | A1 | | 5/2004 | Seki | | |
| 2004/0114732 | A1 | * | 6/2004 | Choe et al. | ................. | 379/88.17 |
| 2004/0209649 | A1 | * | 10/2004 | Lord | ............................... | 455/558 |
| 2006/0182247 | A1 | * | 8/2006 | Batni et al. | ..................... | 379/189 |
| 2007/0121821 | A1 | * | 5/2007 | Su | .............................. | 379/88.13 |
| 2007/0142942 | A1 | * | 6/2007 | Hyatt | ............................. | 700/94 |
| 2008/0045209 | A1 | * | 2/2008 | Mo et al. | ....................... | 455/433 |

FOREIGN PATENT DOCUMENTS

| CN | 1541490 | 10/2004 |
| CN | 1744629 | 3/2006 |
| CN | 1812449 | 8/2006 |
| JP | 3-256437 | 11/1991 |
| JP | 10145460 | 5/1998 |
| JP | 11-285065 | 10/1999 |
| JP | 2002-199056 | 7/2002 |

(Continued)

OTHER PUBLICATIONS

"DBTEL Cellphone Sets Launched," The Daily Star, vol. 4, Num 221, Jan. 8, 2004 http://www.thedailystar.net/2004/01/08/d40108050654.htm.*

(Continued)

Primary Examiner — Ariel Balaoing
Assistant Examiner — Larry Sternbane
(74) Attorney, Agent, or Firm — Lee, Hong, Degerman, Kang & Waimey (57) ABSTRACT The present invention relates to controlling a communication connection in a mobile terminal. Preferably, the present invention comprises transmitting a communication request signal for attempting a communication connection with a device, receiving a signal for indicating the progress of the communication connection, wherein a ring-back tone is generated upon receiving the signal, and controlling an output of the ring-back tone until the communication connection is accomplished.

24 Claims, 9 Drawing Sheets

(56) References Cited

FOREIGN PATENT DOCUMENTS

| | | | | |
|---|---|---|---|---|
| JP | 2006-325216 | 11/2006 | | |
| KR | 10-2000-0027956 | 5/2000 | | |
| KR | 10-2005-0078580 | 8/2005 | | |
| KR | 10-2006-0020879 | 3/2006 | | |
| KR | 10-0547835 | 6/2006 | | |
| WO | 03/081878 | 10/2003 | | |
| WO | WO 2005/004453 | 1/2005 | | |
| WO | WO 2005004453 A1 * | 1/2005 | ............ | H04M 3/487 |
| WO | WO 2006063505 A1 * | 6/2006 | .............. | H04M 3/42 |

OTHER PUBLICATIONS

Motorola iDEN i60c Phone User's Guide, selected pages, May 3, 2002 http://www.cellphones.ca/upload/manuals/motorola_i60c.pdf.*

User reviews of the Motorola IDEN i60c cellular telephone from Dec. 24, 2003 (and other dates) at http://www.phonescoop.com/phones/user_reviews.php?phone=183.*

Korean Intellectual Property Office Application Serial No. 10-2006-0105344, Notice of Allowance dated May 20, 2013, 2 pages.

Japan Patent Office Application Serial No. 2007-093439, Notice of Allowance dated Nov. 13, 2012, 3 pages.

* cited by examiner

CONTROLLING RING-BACK TONE OUTPUT PRIOR TO A COMMUNICATION CONNECTION IN MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2006-105344, filed on Oct. 27, 2006, the contents of which are hereby incorporated by reference herein in their entirety.

FIELD OF THE INVENTION

The present invention relates to controlling a communication connection in a mobile terminal.

BACKGROUND OF THE INVENTION

Figure 1:
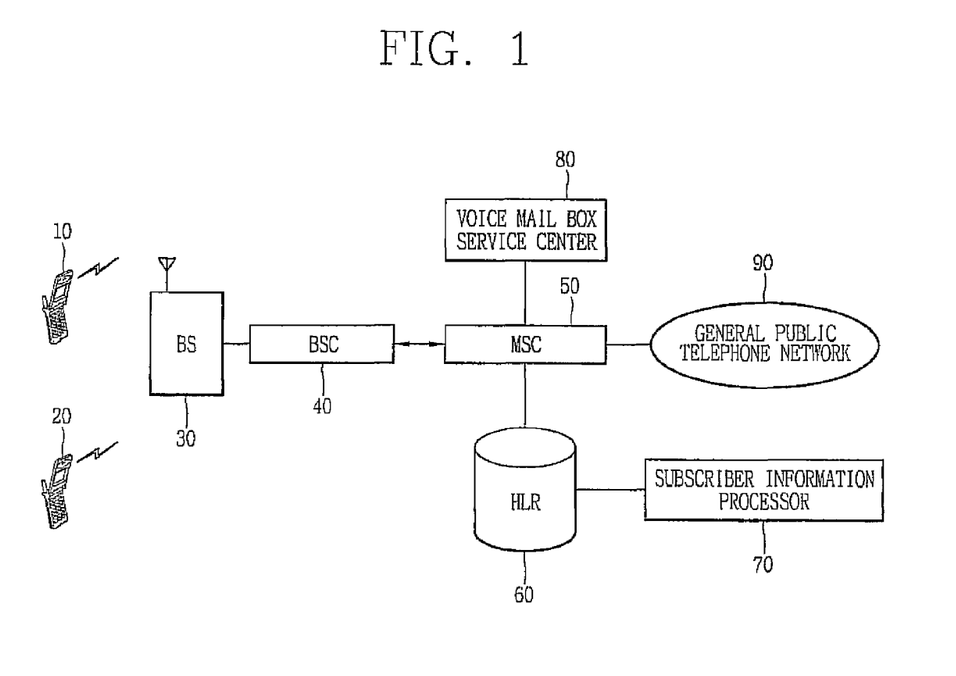
FIG. 1 is a conceptual view illustrating a general mobile communication system.

FIG. 1 is a conceptual view generally illustrating a mobile communication system. Referring to FIG. 1, a mobile communication system includes mobile communication terminals such as an origination mobile station 10 (MS 10), a destination mobile station 20 (MS 20), a base station (BS) 30, a base station controller (BSC) 40, a mobile switching center (MSC) 50, a home location register (HLR) 60 and a base station information processor 70. The mobile communication system may be connected with a voice mail box service center 80 and a general public telephone network 90.

Herein, the base station 30 handles communication with the MS 10 and the MS 20. The BSC 40 manages radio resources and controls the BS 30 between the BS 30 and the MSC 50. The MSC 50 stores information regarding a location and service profile of the MS 10 and the MS 20, and performs switching functions to allow communication.

In the mobile communication system, when the origination MS 10 attempts a communication (call) connection to the destination MS 20, the MS 10 transmits a communication request signal to the MSC 50. The MSC 50 then acquires location information regarding the destination of the MS 20 from the HLR 60 according to the communication request signal, and performs paging to a corresponding location region of the destination MS 20. During the communication connection attempt, the MSC 50 transmits a ring-back tone to the origination MS 10. The ring-back tone serves to inform a caller of the origination MS 10 that the communication connection is being made.

Consequently, the ring-back tone is a mechanical sound that may be considered audible pollution to a caller who is continuously exposed thereto. To remedy this, services are currently available for improving the sound of the ring-back tone. For example, one service provides music as the ring-back tone. Accordingly, the personality of the called party may be expressed via the type of musical ring-back tone used.

However, the musical ring-back tone, as well as the mechanical ring-back tone, is provided irrespective of an origination MS 10 setting. Thus, the ring-back tone is transferred unilaterally and indiscriminately to the caller who may not want to listen to the ring-back tone. Consequently, when the caller attempts a communication connection while watching video through the origination MS 10, the caller has difficulty listening to the sound of the video being reproduced due to the ring-back tone.

SUMMARY OF THE INVENTION

The present invention is directed to controlling a communication connection in a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for controlling a communication connection in a mobile terminal, the method comprising transmitting a communication request signal for attempting a communication connection with a device, receiving a signal for indicating the progress of the communication connection, wherein a ring-back tone is generated upon receiving the signal, and controlling an output of the ring-back tone until the communication connection is accomplished.

In one aspect of the invention, controlling the output of the ring-back tone comprises silencing a sound of the ring-back tone. In another aspect of the invention, controlling the output of the ring-back tone comprises lowering an audio level of the ring-back tone.

Preferably, the method further comprises displaying visual information indicating the progress of the communication connection until the communication connection is accomplished. Preferably, the method further comprises indicating the accomplishment of the communication connection.

Preferably, the communication request signal is transmitted while reproducing media in the mobile terminal, wherein the media is at least one of information stored in the mobile terminal and broadcast information received by the mobile terminal.

In one aspect of the invention, controlling the output of the ring-back tone comprises silencing a sound of the ring-back tone while outputting a sound of the media reproduction. In another aspect of the invention, controlling the output of the ring-back tone comprises lowering an audio level of the ring-back tone below an audio level of the media reproduction.

In a further aspect of the invention, the method further comprises controlling at least one of an output of the media reproduction and a communication audio level when the communication connection is accomplished. Preferably, controlling the output of the media reproduction comprises silencing a sound of the media reproduction. Alternatively, controlling the output of the media reproduction comprises lowering an audio level of the media reproduction below the communication audio level.

In one aspect of the invention, the method further comprises at least one of incrementally lowering an audio level of the media reproduction and incrementally raising a communication audio level when the communication connection is accomplished. In another aspect of the invention, the method further comprises storing the reproduced media in the mobile terminal when the communication connection is accomplished. In a further aspect of the invention, the method further comprises reproducing the stored media when the communication connection is terminated.

Preferably, the ring-back tone is generated by at least one of the mobile terminal and a network server. Preferably, the communication request signal is continuously transmitted a predetermined number of times if the communication connection is not accomplished.

In accordance with another embodiment of the present invention, a mobile terminal capable of controlling a communication connection, the mobile terminal comprising a controller for transmitting a communication request signal for attempting a communication connection with a device, and a communication module for receiving a signal for indicating the progress of the communication connection, wherein a ring-back tone is generated upon receiving the signal, wherein the controller controls an output of the ring-back tone until the communication connection is accomplished.

Preferably, the controller controls the output of the ring-back tone by silencing a sound of the ring-back tone. Preferably, the controller controls the output of the ring-back tone by lowering an audio level of the ring-back tone.

In one aspect of the invention, the mobile terminal further comprises a display for displaying visual information indicating the progress of the communication connection until the communication connection is accomplished. The display may also indicate the accomplishment of the communication connection.

Preferably, the controller transmits the communication request signal while the mobile terminal reproduces media. Preferably, the media is at least one of information stored in the mobile terminal and broadcast information received by the mobile terminal. Preferably the controller controls the output of the ring-back tone by silencing a sound of the ring-back tone while outputting a sound of the media reproduction. Preferably, the controller controls the output of the ring-back tone by lowering an audio level of the ring-back tone below an audio level of the media reproduction.

Preferably, the controller controls at least one of an output of the media reproduction and a communication audio level when the communication connection is accomplished. Preferably, the controller controls the output of the media reproduction by silencing a sound of the media reproduction. Preferably, the controller controls the output of the media reproduction by lowering an audio level of the media reproduction below the communication audio level.

Preferably, the controller performs at least one of incrementally lowering an audio level of the media reproduction and incrementally raising a communication audio level when the communication connection is accomplished. Preferably, the controller stores the reproduced media in the mobile terminal when the communication connection is accomplished. Preferably, the controller reproduces the stored media when the communication connection is terminated.

Preferably, the ring-back tone is generated by at least one of the mobile terminal and a network server. Preferably, the controller continuously transmits the communication request signal a predetermined number of times if the communication connection is not accomplished.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to controlling a communication connection in a mobile terminal. A mobile communication terminal and a method for controlling a communication connection thereof according to exemplary embodiments of the present invention will now be described in detail with reference to the accompanying drawings.

Figure 2:
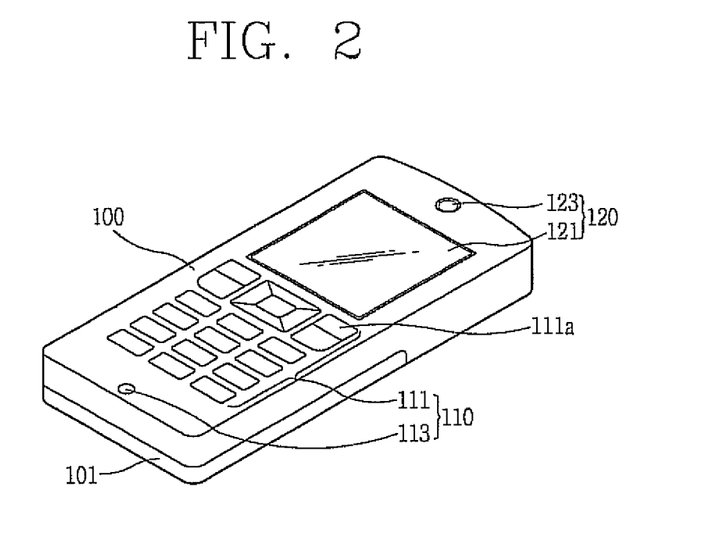
FIG. 2 is a perspective view illustrating a mobile terminal in accordance with one embodiment of the present invention.

FIG. 2 is a perspective view illustrating a mobile terminal in accordance with one embodiment of the present invention. Referring to FIG. 2, a bar type mobile communication terminal comprises a main body 100 formed of a single body. An input unit 110 is disposed at a lower portion of a front surface of the main body 1001 and an output unit 120 is disposed at an upper portion thereof. A battery 101 is detachably mounted on a rear surface of the main body 100 for providing power to the main body 100.

The input unit 110 allows a user to input information into the main body 100, such as a number, character or sound to the main body 100. Preferably, the input unit 110 comprises a manipulation unit 111, such as a keypad that can be manipulated by the user's fingers, and a microphone 113 for receiving a sound produced by the user.

Preferably, the manipulation unit 111 is implemented in the mobile terminal such that when the user presses a key button 111a, a dome switch (not shown) disposed within the main body 100 is pressed to activate a printed circuit board (PCB) (not shown) to generate a signal. Alternatively, the manipulation unit 111 may be implemented such that when the user presses the key button 111a, a sensor (not shown) is activated upon sensing the touch of the user to generate the signal.

The output unit 120 visually or audibly outputs specific information according to user manipulation or a program set within the main body 100. Preferably, the output unit 120 comprises a display 121 for outputting visual information and a speaker 123 for outputting audible information. Here, the display 121 may be a liquid crystal display (LCD) or an organic light emitting diode (OLED).

The operational method of the mobile terminal according to the present invention will now be described with reference to FIG. 3.

Figure 3:
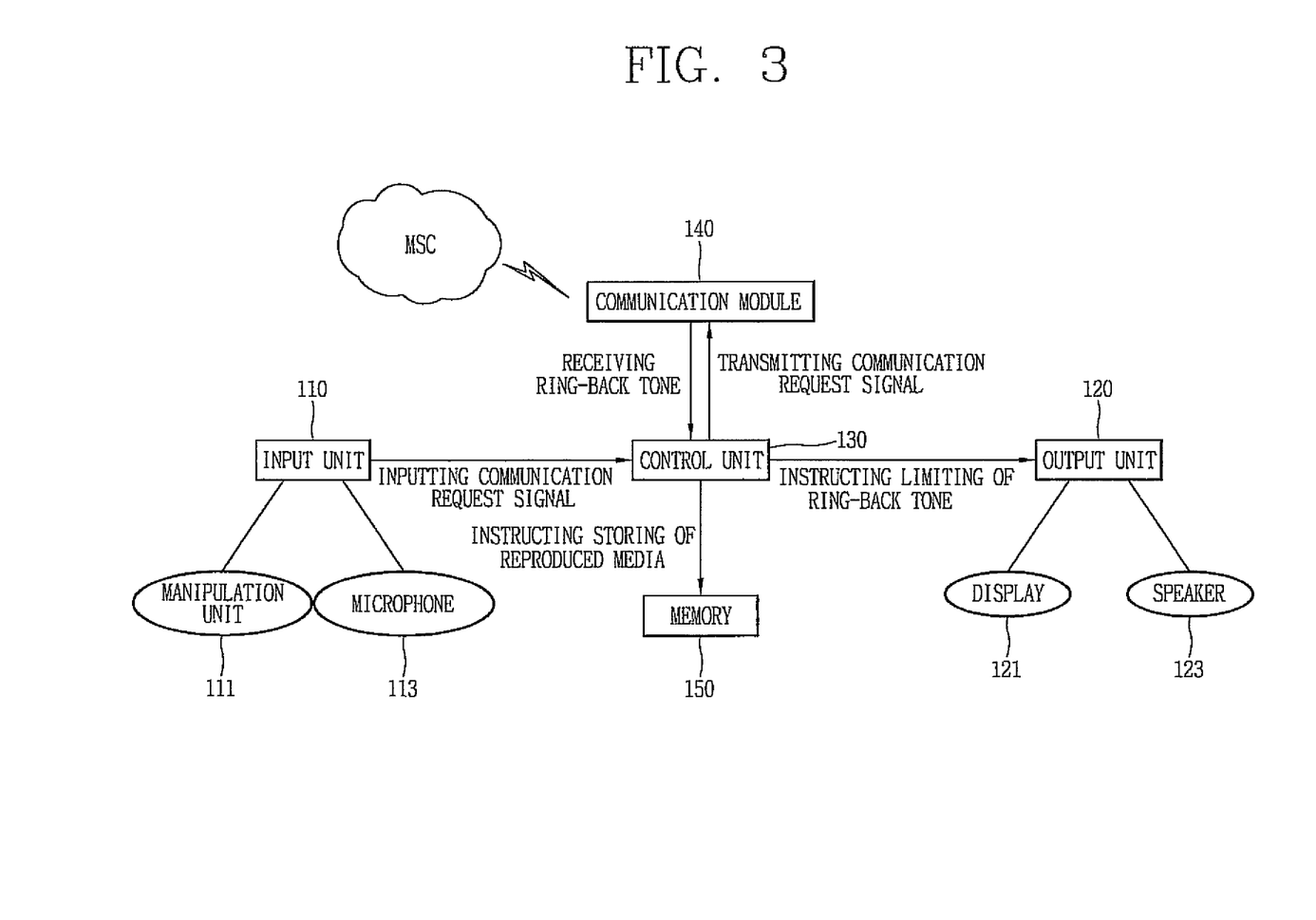
FIG. 3 is a conceptual view illustrating a method for controlling a communication connection in a mobile terminal in accordance with one embodiment of the present invention.

FIG. 3 is a conceptual view illustrating a method for operating the mobile terminal of FIG. 2 in accordance with one embodiment of the present invention. Referring to FIG. 3, when a user of a mobile terminal wishes to communicate with another terminal, the user operates the input unit 110 for inputting a communication request signal to a control unit 130. Preferably, the user inputs the communication request signal by inputting a phone number of the party the user wishes to communicate with by manipulating keys of the manipulation unit 111 and/or the key button 111a. Alternatively, the user may input the phone number via a voice signal through the microphone 113.

The control unit 130 installed within the main body 100 controls functions of electronic components mounted in the main body 100 and may have the same shape as the PCB. Upon receiving the communication request signal, the control unit 130 transmits the signal to the mobile switching center (MSC) through a communication module 140. While proceeding with the communication connection, the MSC may transmit a ring-back tone to the mobile terminal, wherein the ring-back tone is received by the communication module 140. Alternatively, the ring-back tone may be generated in the mobile terminal during the communication connection attempt. Thereafter, the ring-back tone is received by the control unit 130. Herein, the MSC and the mobile communication system including the MSC are the same as those described above with reference to FIG. 1.

In accordance with the present invention, the control unit 130 does not output the ring-back tone as it is received. Preferably, the control unit 130 alters the output of the ring-back tone. For example, the control unit 130 may prevent the ring-back tone from being outputted through the speaker 123. Alternatively, the ring-back tone may be outputted through the speaker 123 at a lower sound volume than the originally set sound volume.

In one aspect of the invention, the user may input the communication request signal while watching reproduced media including a broadcast program (broadcast information) on the mobile terminal. Here, broadcast information received through the communication module 140 is reproduced in real time unlike information recorded in a file stored in the main body 100. In addition, when the terminal is changed to a communication (call) state according to a communication connection, reproduction of the broadcast information may be stopped to smoothly perform the communication.

If reproduction of the broadcast information is not stopped, then a sound output associated with the broadcast information reproduction may be stopped or minimized to smoothly perform the communication. Additionally, the user may not be able to pay attention to the broadcast information reproduction while conducting the communication. Accordingly, in another aspect of the invention, the control unit 130 may store the broadcast information being reproduced in the memory 150. Thus, the user can reproduce the stored broadcast information after the wireless communication is terminated.

Figure 4:
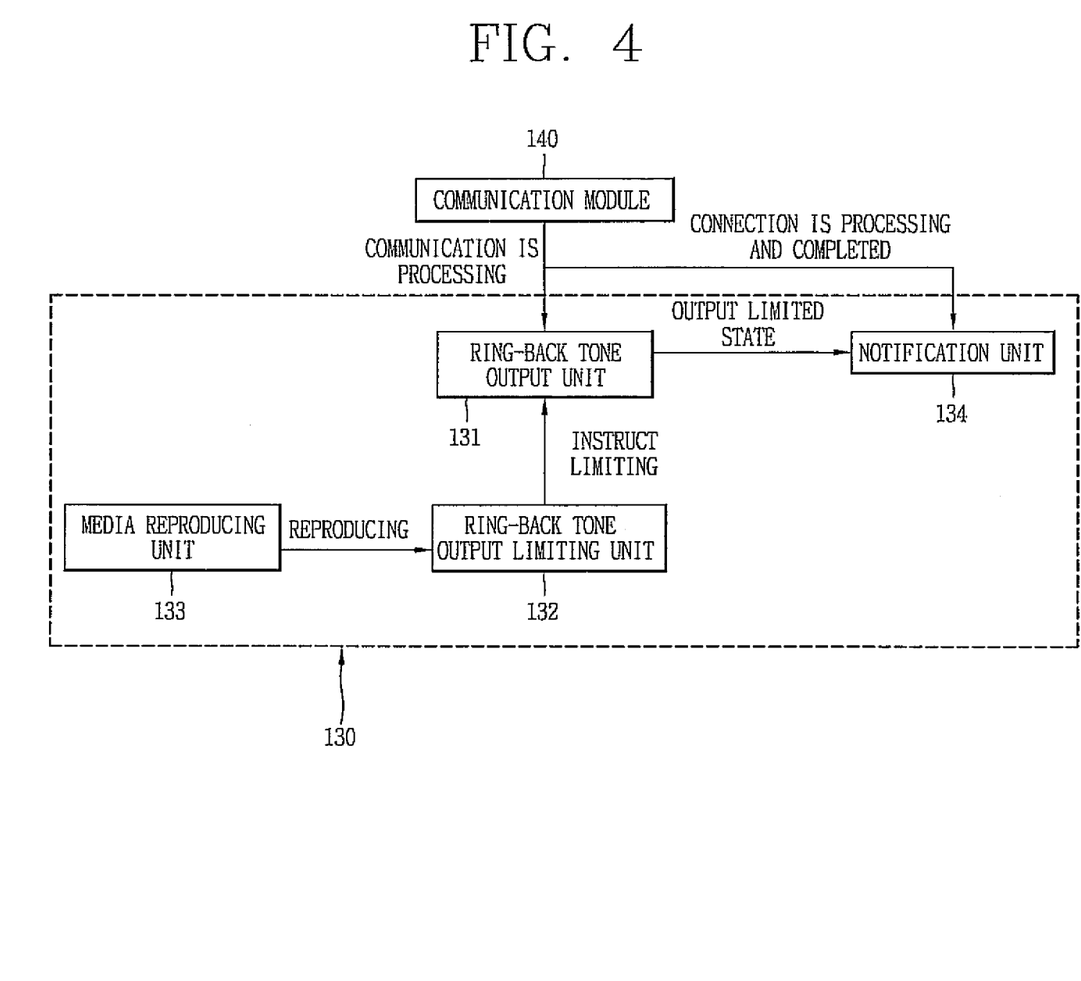
FIG. 4 is a conceptual view illustrating a construction of a control unit of a mobile terminal in accordance with one embodiment of the present invention.

The control unit 130 will now be described in detail. Referring to FIGS. 3 and 4, the control unit 130 includes a ring-back tone output unit 131. The ring-back tone output unit 131 is electrically connected with the communication module 140 to control the output unit 120, specifically the speaker 123, to output the ring-back tone as a standby sound while the communication connection is being attempted.

The control unit 130 also includes a ring-back tone output limiting unit 132 for controlling an operation of the ring-back tone output unit 131. Preferably, the ring-back tone output limiting unit 132 controls the ring-back tone output unit 131 to prevent the output of the ring-back tone. In addition, when a media reproducing unit 133 for reproducing media is operated, the ring-back tone output limiting unit 132 may control the ring-back tone output unit 131 to output the ring-back tone at a sound level lower than a sound level of the reproduced media.

The control unit 130 additionally includes a notification unit 134 for visually informing the user about a communication connection through the display 121 upon receiving information from the ring-back tone output unit 131 that the ring-back tone output has been limited. In addition, when the communication connection is completed, the notification unit 134 may control the output unit 120 to inform the user about a completed state of the communication connection.

Figure 5:
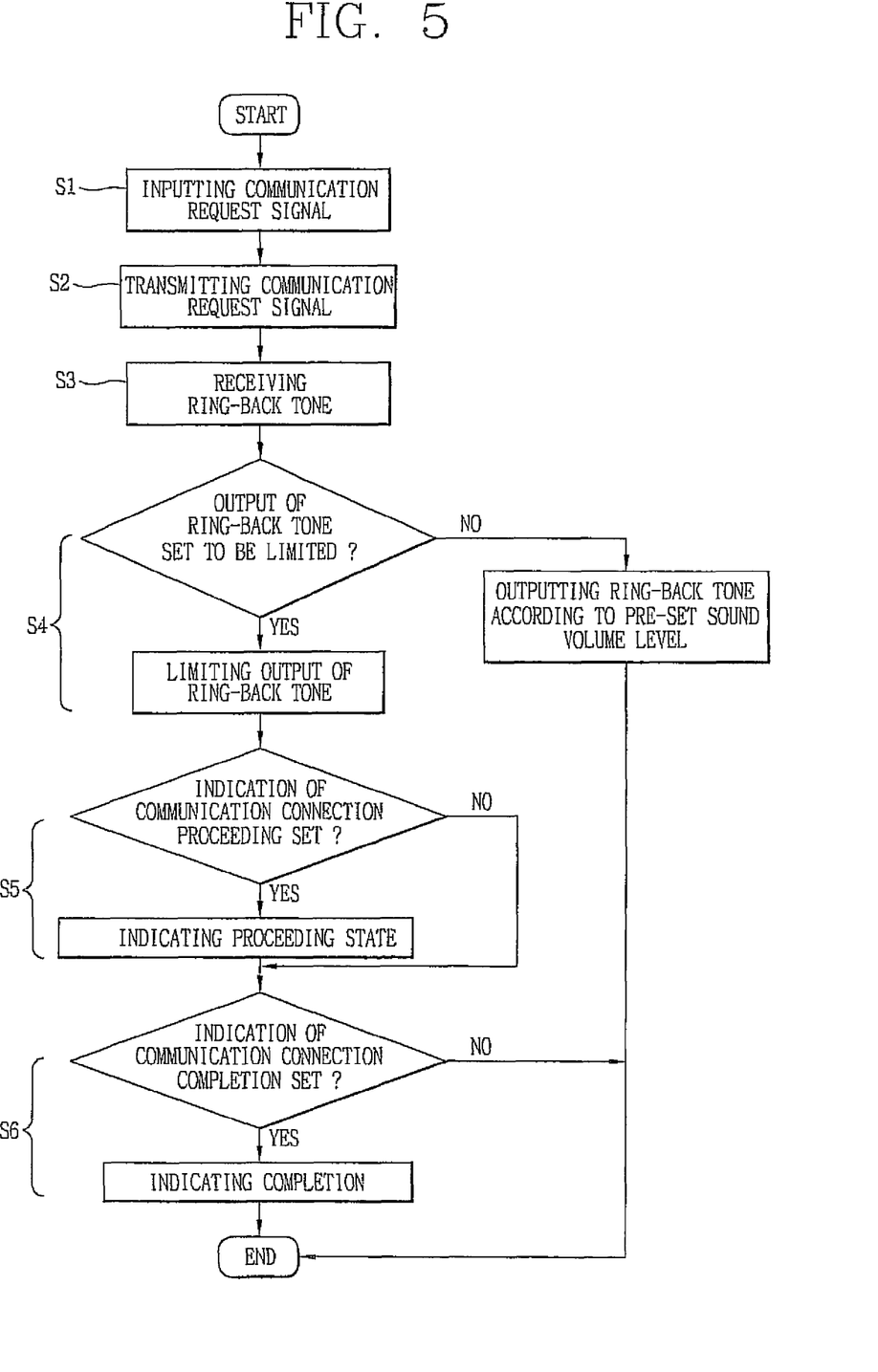
FIG. 5 is a flow chart illustrating a method for controlling a communication connection in accordance with one embodiment of the present invention.
Figure 6A:
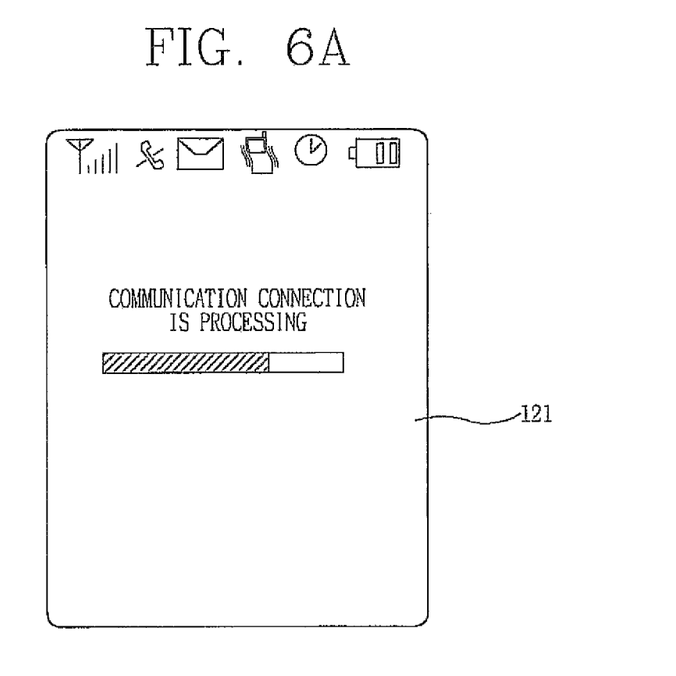
FIG. 6A is a conceptual view of a mobile terminal display for displaying a state of a communication connection proceeding in accordance with one embodiment of the present invention.
Figure 6B:
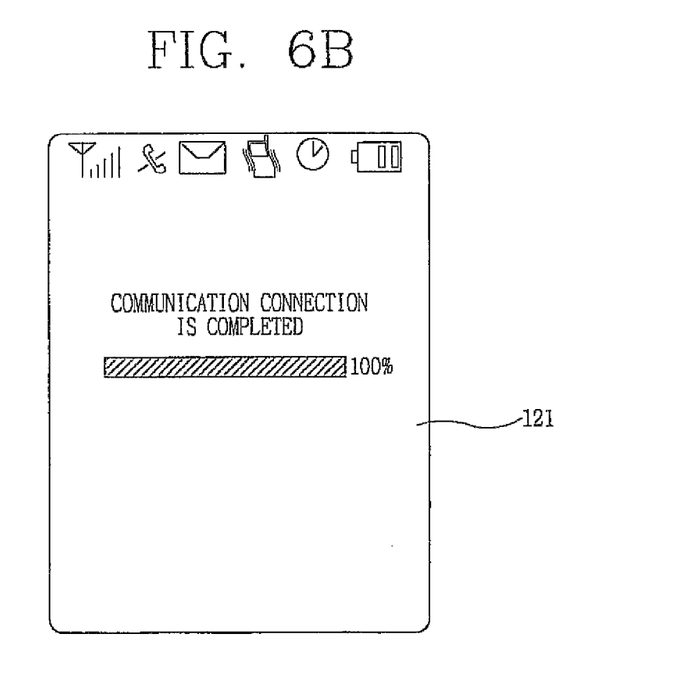
FIG. 6B is a conceptual view of a mobile terminal display for indicating the completion of a communication connection in accordance with one embodiment of the present invention.

The control process of the communication connection of the mobile terminal will now be described in detail with reference to FIGS. 5, 6A and 6B. FIG. 5 is a flow chart illustrating a method for controlling a communication connection in accordance with one embodiment of the present invention. Referring to FIGS. 2, 4 and 5, when a first user wishes to perform wireless communication with a second user of a different terminal through the first user's terminal, the first user can manipulate the input unit 110 to input a communication request signal (S1). The inputted communication request signal is then transmitted to the MSC (S2), which mediates the communication connection according to the communication request. During this time, a ring-back tone is received by the terminal (S3).

Upon receiving the ring-back tone, the terminal may output the ring-back tone at its pre-set sound volume level or at an altered sound volume level according to whether the terminal is set to limit the ring-back tone output (S4). Preferably, if the terminal is set to limit the ring-back tone output, the ring-back tone is prevented from being heard by the user or outputted at a sound volume level lower than the pre-set sound volume level.

Irrespective of the ring-back tone output limitation, the communication connection proceeds. Preferably, the state of the proceeding is visually indicated to the user if the mobile terminal is set to indicate such information (S5). Accordingly, if the mobile terminal is not set to indicate such information, the state of the communication connection proceeding is not indicated to the user. FIG. 6A illustrates an example of the indication, in which a graphic element is displayed together with a phrase for informing the user of the communication connection proceeding on the display 121. However, if the ring-back tone is outputted at a low level (S4), it may not be necessary to visually indicate the state of the proceeding.

Preferably, if the communication connection attempt is interrupted by the MSC during the communication connection process, the terminal continues attempting the communication connection. In this case, the ring-back tone may also be limited so that the user is not audibly stressed by the mobile terminal during the continuous communication connection attempt.

When the communication connection is completed, the completed state of the communication connection may be audibly or visually indicated to the user if the mobile terminal is set to indicate such information (S6). In an audible indication method, a message for indicating the formation of a communication available state may be outputted through the speaker 123. In a visual indication method, as shown in FIG.

6B, a graphic element may be displayed together with a phrase for indicating to the user the completion of the communication connection (S6).

As the communication connection is completed, the user can perform wireless communication, such as a call, with another party. In this manner, control of the terminal communication connection process may be terminated.

Figure 7:
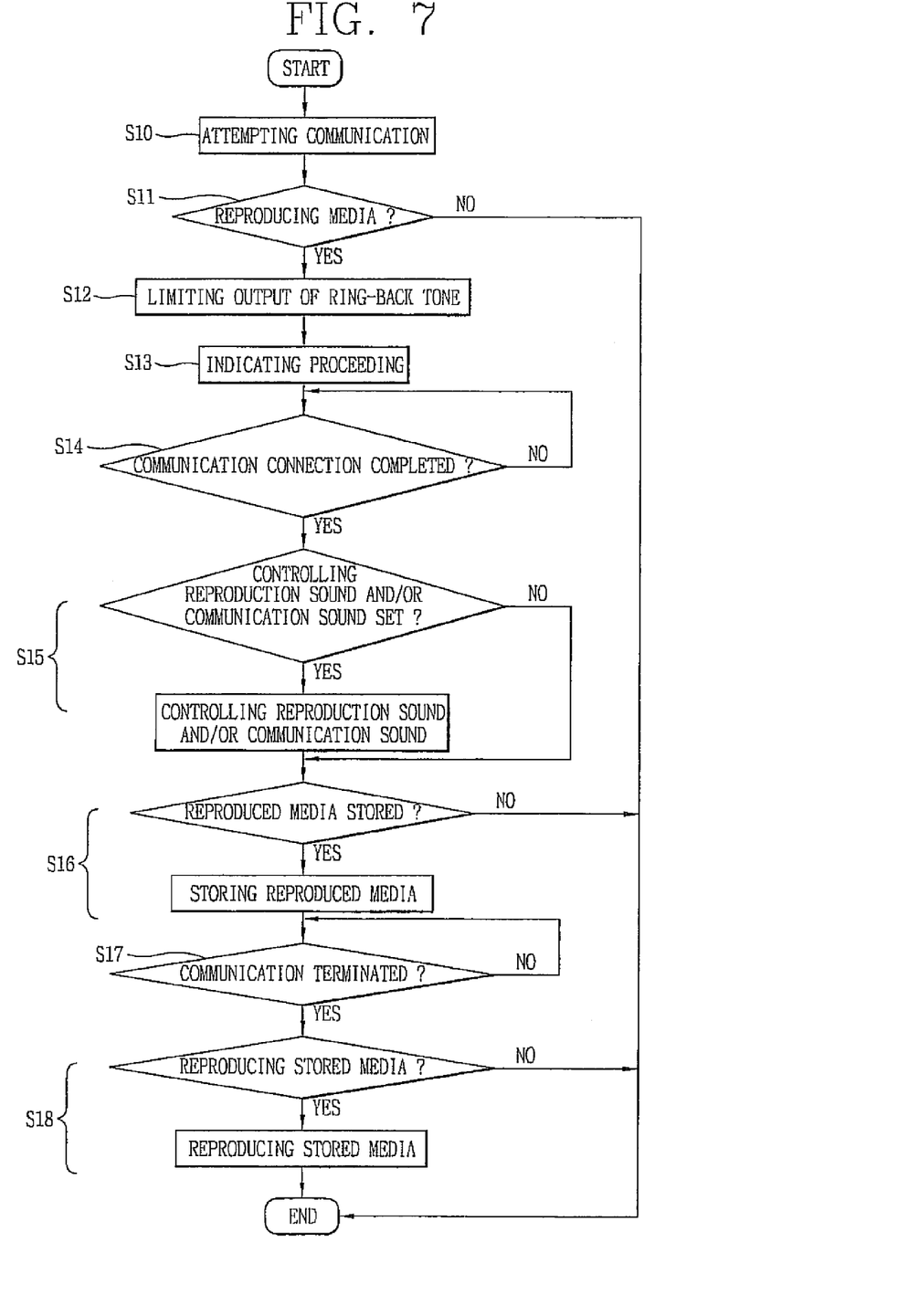
FIG. 7 is a flow chart illustrating a method for controlling a communication connection in accordance with another embodiment of the present invention.

A method for controlling a communication connection when media is reproduced through the terminal will now be described. FIG. 7 is a flow chart illustrating a method for controlling a communication connection in accordance with another embodiment of the present invention. Referring to FIGS. 4, 5 and 7, the user attempts communication (S10) by manipulating the input unit 110 to input a communication request signal (S1). Thereafter, the communication request signal is transmitted (S2) and a ring-back tone is received (S3), wherein the ring-back tone may be outputted (S4).

The terminal checks then whether the media reproducing unit 133 is currently operated (S11). If the media reproducing unit 133 is not operated, the terminal follows the above-described control method. Otherwise, if the media reproducing unit 133 is operated and the terminal is set to limit a ring-back tone output, the terminal limits the output of the ring-back tone (S12). Preferably, when limiting the ring-back tone output, an output level of the ring-back tone is lowered to a level below a sound output level of the media reproduction (S12).

Figure 8:
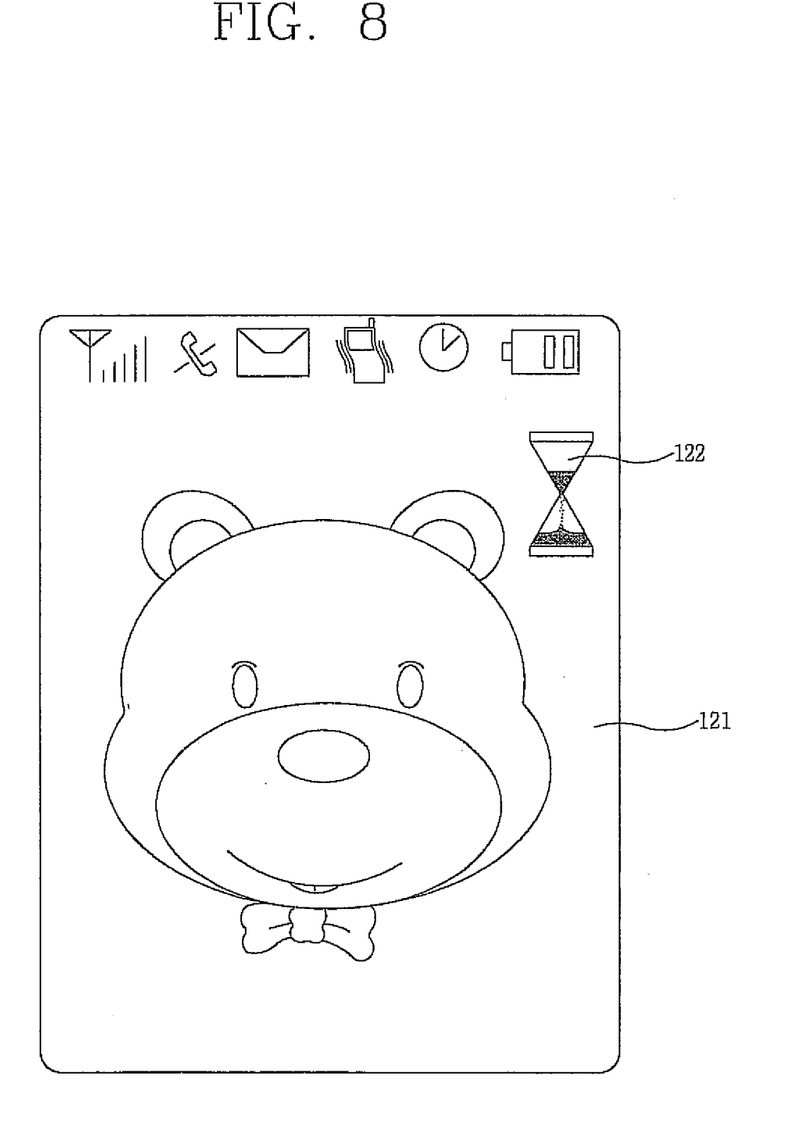
FIG. 8 is a conceptual view of a mobile terminal display for displaying a state of a communication connection proceeding in accordance with another embodiment of the present invention.

When the ring-back tone output is limited, the state of the communication connection proceeding may be indicated to the user (S13). For this purpose, as shown in FIG. 8, a visual icon such as an hourglass 122 may be used. Preferably, in order to minimize interruption of the user's enjoyment of outputted media, the visual icon may be displayed at a corner of the display 121.

The ring-back tone is generated during the communication connection attempt. Thus, when the communication connection is completed, the ring-back tone may no longer need to be limited. Accordingly, the terminal checks whether the communication connection is completed when a state of the ring-back tone output is limited (S14).

Preferably, when the communication connection is completed, a relationship between a media reproduction sound and a communication sound (call sound) is controlled (S15). In order to control the relationship, the output of the media reproduction sound may be stopped or outputted at a level lower than an output level of the call sound. Also, to smoothly transfer between the two sounds, the media reproduction sound may be lowered by stages while the call sound is increased by stages. Thus, the output level of the media reproduction sound may be maintained to an almost-zero level while the call sound may be maintained at a pre-set level.

In accordance with the present invention, limiting the sound output of the media reproduction and interference of the wireless communication may make it difficult for the user to properly watch the media being reproduced. Thus, the terminal may store the currently reproduced media in the memory 150 for later viewing if the terminal is previously set to perform such function (S16).

Preferably, the currently performed communication is completed prior to resuming reproduction of the stored information. Thus, the terminal checks whether the current communication is terminated (S17) in order to reproduce the stored media.

When the communication is terminated, the terminal queries the user whether to reproduce the stored media in the form of a pop-up image on the display 121, for example (S18). The stored image may also be immediately reproduced upon termination of the communication according to a user's preference.

Figure 9:
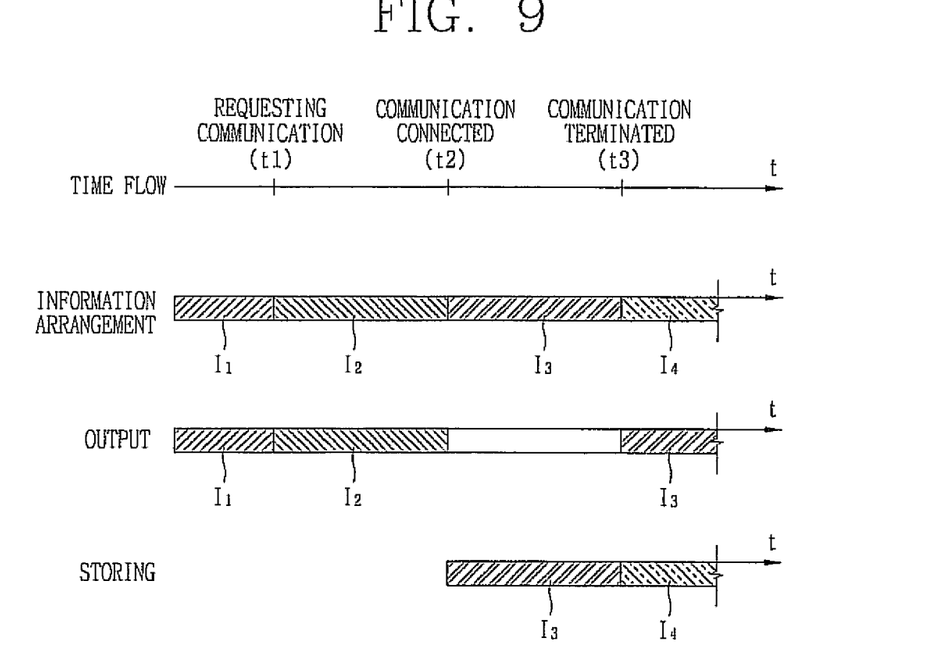
FIG. 9 is a conceptual view of a method for reproducing and storing information in relation to a lapse of time in accordance with one embodiment of the present invention.

Storing and reproducing information will now be described in detail with reference to FIG. 9. FIG. 9 is a conceptual view of a method for reproducing and storing information in relation to a lapse of time in accordance with one embodiment of the present invention.

Referring to FIG. 9, points of time t1, t2 and t3 can be specified in a time interval. Preferably, at the point of time t1, a communication request is made, at the point of time t2, a communication connection is made, and at the point of time t3, the communication is terminated. In this respect, elements $I_1, I_2, I_3$ and $I_4$ represent information that can be sequentially reproduced and outputted if there are no temporal discriminations of the three points of time t1, t2 and t3.

Before the point of time t1, the first information $I_1$ is reproduced and outputted. During an interval between the point of time t1 and the point of time t2, the second information $I_2$ is outputted. During this interval, as mentioned above, the ring-back tone output is limited so as not to interfere with a user's appreciation of the second information $I_2$.

During an interval between the point of time t2 and the point of time t3, the third information $I_3$ is stored rather than reproduced for output so that it does not interfere with the communication connected at the point of time t2. The stored third information $I_3$ can be reproduced and outputted according to a user selection after the point of time t3 when the communication is terminated. While the third information $I_3$ is outputted, the fourth information $I_4$ is stored. The stored fourth information $I_4$ is then outputted when output of the third information $I_3$ is finished.

In this manner, by outputting the stored information and storing the new information, the user can enjoy media that the user skipped during communication after the communication is completed. In particular, the above-described storing and reproducing method is useful when real-time information, such as broadcast information, is received by the mobile terminal.

In the present invention, a bar-type mobile terminal is used as an example; however, the present invention is not limited thereto but can be applied to any type of mobile terminal including a flip type, a folder type and a slide type, for example, so long as the mobile terminal can perform wireless communication. Furthermore, the present invention may be implemented in a portable electronic device such as a PDA, which performs a wireless communication function as an auxiliary function.

In addition, the ring-back tone for the communication or call used in the present invention includes a sound stored in the terminal itself and outputted according to an MSC signal, as well as a mechanical sound outputted after being transmitted to the terminal from the MSC while the terminal attempts a communication connection. The ring-back tone of the present invention also includes a sound according to a service in which music set by a called party is transmitted to a caller. Preferably, every sound outputted from the terminal of the caller in a standby state when the communication connection is attempted may be considered a ring-back tone regardless of its output type in accordance with the present invention.

As so far described, the mobile terminal and the method for controlling a communication connection according to the present invention has many advantages. For example, because a ring-back tone output limiting unit for limiting a ring-back tone output is provided, a caller can limit the output of a ring-back tone that is unconditionally received according to a setting at the MSC or by a called party regardless of the caller's intention.

Also, by indicating the state of the communication connection proceeding and the communication connection completion while the ring-back tone is limited, the ring-back tone's function of indicating a call status to the user is substituted by visually displaying the call status on a terminal display.

Moreover, by controlling a sound of the mobile terminal when a communication connection is completed while media is reproduced, a smooth transition is made between a media reproduction sound and a call sound. Thus, the user may adapt to the change in sound more easily.

Furthermore, by storing media when a communication connection is completed while the media is reproduced, the media may be reproduced at a later time so that the user can view the media after the communication is terminated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a communication connection in a mobile terminal, the method comprising:
    transmitting a communication request signal from the mobile terminal to a network for attempting a communication connection with a device connected to the network, wherein the communication connection is accomplished when the device accepts the communication connection;
    receiving, in the mobile terminal, a signal from the network for indicating the progress of the communication connection attempt while the communication connection is not yet accomplished, wherein a ring-back tone is generated upon receiving the signal, and wherein the signal for indicating the progress of the communication connection attempt informs a user of a current completion level of the communication connection attempt;
    displaying, on the mobile terminal, visual information indicating the progress of the communication connection attempt; and
    controlling, in the mobile terminal, an output of the ring-back tone until the communication connection is accomplished,
    wherein the communication request signal continues to be transmitted a predetermined number of times if the communication connection is not accomplished, and
    wherein controlling the output of the ring-back tone comprises automatically silencing a sound of the ring-back tone while the communication request signal continues to be transmitted for the predetermined number of times.

2. The method of claim 1, further comprising indicating the accomplishment of the communication connection.

3. The method of claim 1, wherein the communication request signal is transmitted while reproducing media in the mobile terminal.

4. The method of claim 3, wherein the media is at least one of information stored in the mobile terminal or broadcast information received by the mobile terminal.

5. The method of claim 3, wherein controlling the output of the ring-back tone further comprises performing the silencing the sound of the ring-back tone while outputting a sound of the media reproduction.

6. The method of claim 3, further comprising controlling at least one of an output of the media reproduction or a communication audio level when the communication connection is accomplished.

7. The method of claim 6, wherein controlling the output of the media reproduction comprises silencing a sound of the media reproduction.

8. The method of claim 6, wherein controlling the output of the media reproduction comprises lowering an audio level of the media reproduction below the communication audio level.

9. The method of claim 3, further comprising at least one of incrementally lowering an audio level of the media reproduction or incrementally raising a communication audio level when the communication connection is accomplished.

10. The method of claim 3, further comprising storing the reproduced media in the mobile terminal when the communication connection is accomplished.

11. The method of claim 10, further comprising reproducing the stored media when the communication connection is terminated.

12. The method of claim 1, wherein the ring-back tone is generated by at least one of the mobile terminal or a network server.

13. A mobile terminal capable of controlling a communication connection, the mobile terminal comprising:
    a controller for instructing a communication module to transmit a communication request signal from the mobile terminal to a network for attempting a communication connection with a device connected to the network, wherein the communication connection is accomplished when the device accepts the communication connection; and
    the communication module for receiving a signal from the network for indicating the progress of the communication connection attempt while the communication connection is not yet accomplished, wherein a ring-back tone is generated upon receiving the signal, wherein the signal for indicating the progress of the communication connection attempt informs a user of a current completion level of the communication connection attempt,
    a display for displaying visual information indicating the progress of the communication connection attempt;
    wherein the controller controls an output of the ring-back tone until the communication connection is accomplished,
    wherein the controller instructs the communication module to continue to transmit the communication request signal a predetermined number of times if the communication connection is not accomplished, and
    wherein controlling the output of the ring-back tone comprises automatically silencing a sound of the ring-back tone while the communication request signal continues to be transmitted for the predetermined number of times.

14. The mobile terminal of claim 13, wherein the display indicates the accomplishment of the communication connection.

15. The mobile terminal of claim 13, wherein the controller instructs the communication module to transmit the communication request signal while the mobile terminal reproduces media.

16. The mobile terminal of claim 15, wherein the media is at least one of information stored in the mobile terminal or broadcast information received by the mobile terminal.

17. The mobile terminal of claim 15, wherein the controller controls the output of the ring-back tone by performing the silencing the sound of the ring-back tone while outputting a sound of the media reproduction.

18. The mobile terminal of claim 15, wherein the controller controls at least one of an output of the media reproduction or a communication audio level when the communication connection is accomplished.

19. The mobile terminal of claim 18, wherein the controller controls the output of the media reproduction by silencing a sound of the media reproduction.

20. The mobile terminal of claim 18, wherein the controller controls the output of the media reproduction by lowering an audio level of the media reproduction below the communication audio level.

21. The mobile terminal of claim 15, wherein the controller performs at least one of incrementally lowering an audio level of the media reproduction or incrementally raising a communication audio level when the communication connection is accomplished.

22. The mobile terminal of claim 15, wherein the controller stores the reproduced media in the mobile terminal when the communication connection is accomplished.

23. The mobile terminal of claim 22, wherein the controller reproduces the stored media when the communication connection is terminated.

24. The mobile terminal of claim 13, wherein the ring-back tone is generated by at least one of the mobile terminal or a network server.

* * * * *